United States Patent [19]
Stover

[11] 3,745,465
[45] July 10, 1973

[54] DETECTOR OF FALSE VOR DIRECTION INDICATION

[75] Inventor: Harris A. Stover, Cedar Rapids, Iowa

[73] Assignee: Collins Radio Company, Cedar Rapids, Iowa

[22] Filed: Aug. 26, 1971

[21] Appl. No.: 175,113

[52] U.S. Cl.............. 325/363, 325/364, 343/106 R
[51] Int. Cl. ............................................. H04b 1/06
[58] Field of Search...................... 325/65, 363, 364, 325/455, 472; 343/106 R

[56] References Cited
UNITED STATES PATENTS

| | | | |
|---|---|---|---|
| 3,665,470 | 5/1972 | Hemme | 325/364 |
| 3,271,682 | 9/1966 | Bucher | 325/65 |
| 3,434,056 | 3/1969 | Becker | 325/65 |
| 3,142,062 | 7/1964 | Held | 343/106 |
| 3,389,392 | 6/1968 | Stauffer et al. | 325/364 |

*Primary Examiner*—Benedict V. Safourek
*Attorney*—Richard W. Anderson et al.

[57] ABSTRACT

A monitoring means for detecting asymmetrical location of intermediate frequency bandpass filter output signal components in a VOR receiver to annunciate a mistuning condition which may give rise to false VOR bearing determinations. A frequency discriminator, at the IF bandpass filter center frequency, determines the general nature of the signal passing the filter, and the discriminator output, either AC or DC, is used to operate threshold sensitive alarm indication means.

3 Claims, 3 Drawing Figures

DETECTOR OF FALSE VOR DIRECTION INDICATION

This invention relates generally to improvement in variable omnirange (VOR) receivers and more particularly to a monitoring means for annunciating false VOR bearing indications which may stem from a receiver erroneously tuned to an empty channel adjacent to a relatively strong channel.

The VOR system presently in use employs a cardioid antenna pattern that rotates 30 times per second producing a 30 Hz AM signal in the aircraft receiver. A 30 Hz reference signal is also transmitted as a 30 Hz frequency modulation of a 9960 Hz AM subcarrier with a deviation of ±480 Hz. The airborne receiver develops an output indication of bearing to the ground station by comparing the phase between these two 30 Hz modulations. In another compatible system known as Doppler VOR, the 30 Hz AM modulation does not vary with direction but the phase of the 30 Hz FM modulation of the 9960 Hz subcarrier becomes a function of the direction from the VOR station. These two systems are considered compatible because the same receiver may be employed with both systems.

At the present time, VOR stations are spaced 100 kHz apart in frequency. Future planning, however, calls for reduced spacing between adjacent channels of only 50 kHz so as to double the number of possible ground stations. Reduction of the channel spacing from 100 kHz to 50 kHz, however, can give rise to a potential problem. To illustrate this potential problem, let it be considered that approximately 10.5 kHz is required on either side of the carrier frequency for a particular channel to accommodate the 9960 Hz subcarrier and its modulation sidebands. Further, it may be assumed that the ground station may have a frequency tolerance of ± approximately 5.6 kHz. Further, the assumption of a similar frequency tolerance for the receiver establishes a total bandwidth requirement of ± nearly 22 kHz. In order not to have the modulation sidebands fall near the corner frequencies of the bandpass filter employed for selectivity in the VOR receiver, the total bandpass filter bandwidth required requirement begins to approach 50 kHz. Thus, with the advent of 50 kHz channel spacing, the sidebands of an adjacent channel may well extend on to the skirts of the selectivity defining filter of a particular receiver. Normally, the situation would cause no problem, since if there were any significant signal within the desired channel, it would be sufficiently stronger than the adjacent channel signal on the skirts of the receiver filter selectivity curve that the interference from the adjacent channel would have no effect. However, under the particular circumstance where there is no signal at all on the tuned channel and a relatively strong signal in the adjacent channel, the VOR receiver may give an erroneous direction signal. This situation may unfortunately occur should the receiver be erroneously tuned 50 kHz from a desired channel. Co-pending application Ser. No. 61,954 entitled "VOR Adjacent Channel Sensor" by William R. Hemme, filed Aug. 7, 1970, now U.S. Pat. No. 3,665,470 and assigned to the assignee of the present invention, outlines this similar problem and sets forth a particular solution to the problem.

It is entirely possible that a pilot may through pilot error, in selecting a given frequency for a particular VOR ground station, tune the indicator 50 kHz from the desired frequency and give rise to the particular problem under discussion here. As pointed out in co-pending application Ser. No. 61,954, it is entirely possible for the code identification audio signal to be received with this mistuning situation such that the pilot may be misled into believing he is properly tuned to the desired station. Further, as will be discussed, and as is outlined in co-pending application Ser. No. 61,954, tuning to a channel adjacent to a desired operating channel gives rise to a situation where the receiver, due to the particular selectivity curve of the bandpass filter therein, presents a false VOR indication and develops indicating signals of sufficient strength that the flag warning channel of the receiver does not respond. A completely false VOR direction indication without benefit of flag warning is presented to the pilot with obvious catastrophic results.

In accordance with the present invention, it has been found that the erroneous bearing indication under the above outlined conditions may arise as a result of FM to AM conversion of one of the modulation sidebands resulting from the 9960 Hz subcarrier modulation. This FM to AM conversion would result from slope detection on the skirt of the bandpass filter which provides the receiver selectivity. Thus, the resulting signal which passes through the filter will have AM components derived from the FM modulation of the subcarrier. The output of the receiver AM detector will contain both the 9960 Hz subcarrier and a 30 Hz signal derived from the 30 Hz modulation of the subcarrier. The two 30 Hz modulations can be compared in phase within the receiver to give the erroneous bearing indication. It is extremely important that, under such circumstances, there should be an indication that the bearing information is in fact erroneous.

Accordingly, the object of the present invention is the provision for supplementing a standard VOR receiver circuitry with monitoring circuitry to provide an alarm indication or other annunciation when a false VOR bearing due to adjacent channel mistuning is occurring within the receiver.

The present invention is featured in means to provide standard VOR receivers with an amplifier-limiter-discriminator circuitry to determine the general frequency of the signal passing the receiver selectivity bandpass filter. The output of the discriminator will be a voltage proportional to the frequency which passes the receiver's frequency selective filter. The output of the discriminator may then be fed to a voltage comparator circuitry to determine whether its magnitude exceeds a particular value. With a discriminator output in excess of a predetermined threshold, a signaling device may be activated to annunciate that the bearing information is not reliable.

These and other objects and features of the present invention will become apparent upon reading the following description with reference to the accompanying drawing in which.

Figure 1:
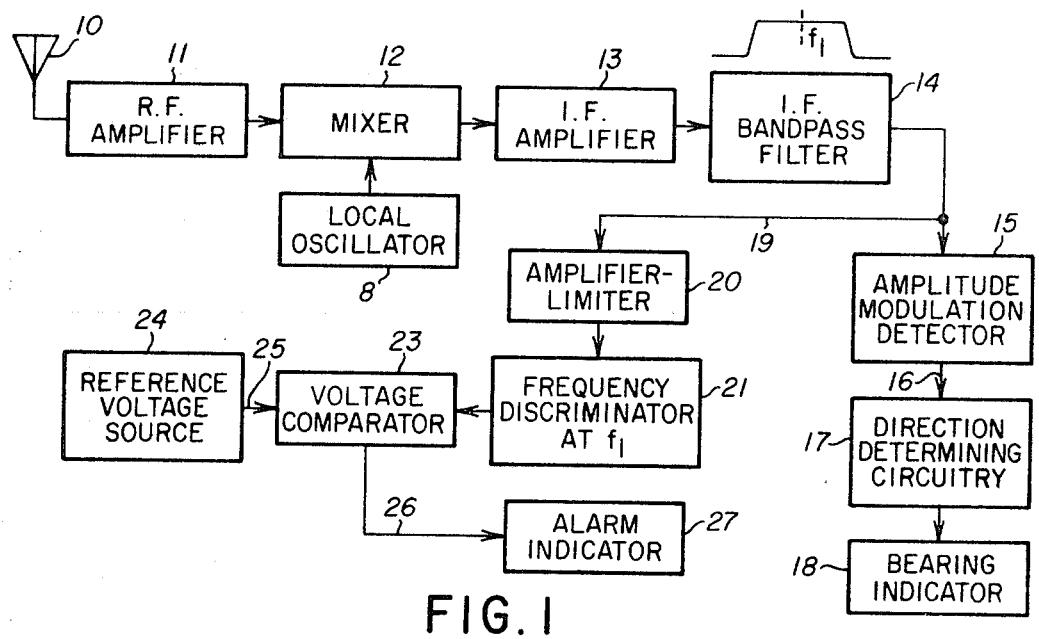
FIG. 1 is a general block diagram of a standard VOR receiver supplemented by a first monitoring embodiment in accordance with the present invention.

With reference to FIG. 1 referenced blocks 8–18 represent functionally a standard VOR receiver. The signal received from a ground station is picked up on antenna 10 and applied to RF amplifier 11. The signal from RF amplifier 11 is applied to mixer 12 into which is injected a signal from a local oscillator 8 to develop an IF output signal from the mixer 12. The intermediate frequency signal is applied to an IF amplifier 13 and through an IF filter 14 to an AM detector 15. The output 16 from AM detector 15 is applied to standard VOR direction determining circuitry 17 which develops an output signal indicative of bearing from the selected VOR ground station on bearing indicator 18.

It is to be realized that tuning of the VOR receiver is affected by selection of a particular frequency output from local oscillator 8 and that it is within IF filter 14 (this function may be included in IF amplifier 13) that the aforedefined false VOR bearing indication problems arise, since the bandpass filter 14, with its inherent slope characteristics permits certain frequency components of an active adjacent channel to pass through filter 14.

In accordance with a first embodiment of the present invention as depicted in FIG. 1, means are employed to monitor the frequency output from the filter 14. Under normal operating conditions, the major frequency components of the desired signal would be well within the bandwidth of filter 14. During a condition where there is no desired signal coming through the filter (that is, the receiver is tuned to an unused channel adjacent to a desired one) signal sideband components from the operating adjacent channel weakly pass the skirts of the filter 14 and give rise to the aforedefined problems within the VOR direction determining circuitry 17.

In accordance with the present invention, the standard VOR receiver circuitry of FIG. 1 is supplemented with a monitoring means comprising an amplifier limiter 20 to which the output 19 from IF filter 14 is applied. The output from amplifier-limiter 20 is applied to a frequency discriminator 21 operating at the center frequency $f_1$ of the bandpass of IF filter 14. The output from frequency discriminator 21 is applied to a voltage comparator 23 to which a reference voltage 25 from a reference voltage source 24 is applied as second input. The output 26 from the voltage comparator is applied as input to a threshold sensitive alarm indicator 27.

In operation, the output of frequency discriminator 21 is a voltage proportional to the deviation of the frequency which passes through the receiver IF bandpass filter 14 from the filter center frequency. The output from discriminator 21, as fed to voltage comparator 23, may be either positive or negative depending upon whether the frequency applied thereto is above or below the center frequency $f_1$ of bandpass filter 14 and comparator 23 may be embodied to respond to a predetermined magnitude of either polarity input. The threshold sensitive alarm indicator responds to the comparator output 26 to activate and annunciate a condition of false VOR bearing indication. During conditions when there is no desired signal coming through the filter with strong signal components at the filter center frequency, weak signals from an adjacent channel, in weakly passing the skirts of the IF filter selectivity curve, produce a large output from frequency discriminator 21 due to a large departure from the filter center frequency, and the voltage comparator 23 will activate the threshold alarm indicator 27 to indicate an erroneous bearing indication.

As indicated above, the bandpass filter 14 of the receiver is the possible source of the problem. The amplifier-limiter 20 is included to make the invalid signal indication insensitive to amplitude variations. The frequency discriminator 21, operating about the bandpass filter 14 center frequency $f_1$, is the basic sensor of the invalid signal.

The voltage comparator 23 and reference voltage source 24 are employed to determine the threshold (actually there are two thresholds, plus or minus) of decision between valid and invalid signals. The threshold alarm indicator 27 provides an indication of whether a valid or invalid signal is being received.

Figure 2:
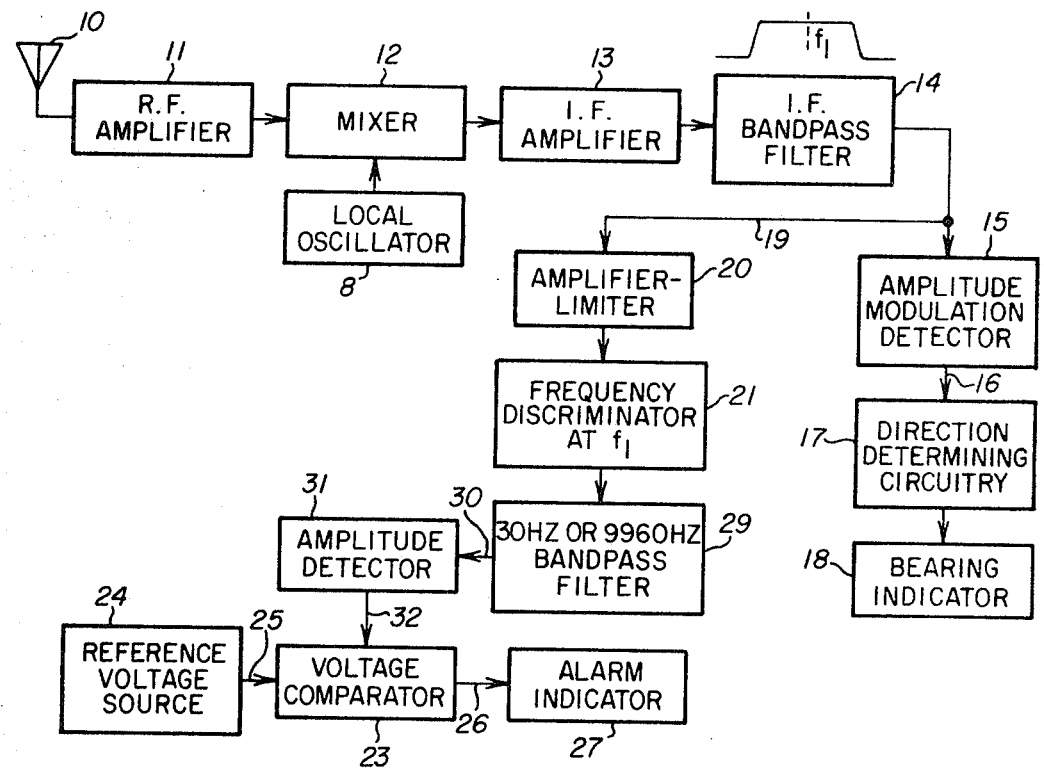
FIG. 2 is a functional block diagram of a standard VOR receiver supplemented with a further monitoring embodiment in accordance with the present invention.

A further embodiment for sensing an invalid VOR bearing indication situation is illustrated functionally in the block diagram of FIG. 2. In FIG. 2 the standard VOR receiver functional blocks 8–18 are again indicated with a modified monitoring circuitry as concerns the frequency spectrum passing through the VOR IF bandpass filter 14. In the system of FIG. 2 the amplifier-limiter 20 again receives the output from IF bandpass filter 14. The output from amplifier-limiter 20 is applied to the frequency discriminator 21 as in the previous embodiment. The output from the frequency discriminator 21 is, however, applied through either a 30 Hz or 9960 Hz bandpass filter 29 on line 28 rather than directly to the voltage comparator 23 as in the previously described embodiment. The output 30 from the 30 Hz or 9960 Hz bandpass filter 29 is applied to an amplitude detector 31, with the output 32 from amplitude detector 31 applied as input to the voltage comparator 23.

In the embodiment of FIG. 2 the frequency discriminator 21, operating about the center frequency $f_1$ of the IF bandpass filter 14 of the receiver, is employed to develop an AC output signal of 30 Hz or 9960 Hz rather than the DC output signal obtained from the previously described embodiment. The development of either of these AC signals by discriminator 21 indicates the presence of signal components from an active adjacent channel appearing asymmetrically in the passband of bandpass filter 14. If the received VOR signal is well within the passband of the filter 14, the output from filter 14 will be strictly an AM signal and there will be no AC output from frequency discriminator 21. However, if the signal passing filter 14 is an adjacent channel signal on the selectivity skirt of the filter, one of the 9960 Hz modulation sidebands will pass the filter much more strongly than the other. Thus, the signal passing the filter due to an adjacent channel signal will have components of frequency modulation at both 9960 Hz and 30 Hz.

One of the 9960 Hz or 30 Hz frequency modulation components passing the filter 14 due to an adjacent channel signal may be filtered off by bandpass filter 29. The magnitude of the selected frequency modulation component would be determined by applying the output 30 from filter 29 to an amplitude detector 31. The output 32 from amplitude detector 31 may be applied to the voltage comparator 23 and compared with the reference voltage 25 from source 24, such that the output 26 from voltage comparator 23, in exceeding a predetermined threshold, may activate the alarm indicator 27.

The monitoring embodiment of FIG. 2, unlike that of the embodiment of FIG. 1 insofar as the use of the 9960 Hz filter is concerned, is dependent upon receiving a double sideband AM signal from the transmitter. Therefore, if the embodiment of FIG. 2 is used with a Doppler VOR which uses only a single 9960 Hz sideband, and the filter 29 following the frequency discriminator 21 is chosen to be a 9960 Hz bandpass filter, an erroneous bearing indication would be indicated when a valid bearing was received. Thus, the embodiment of FIG. 2 would be applicable for usage with Doppler VOR systems only if they are of a double sideband type or if the 30 Hz option is selected for filter 29.

The embodiment of FIG. 1 is employable for standard VOR systems as well as for Doppler VOR systems employing either single or double sideband.

Figure 3:
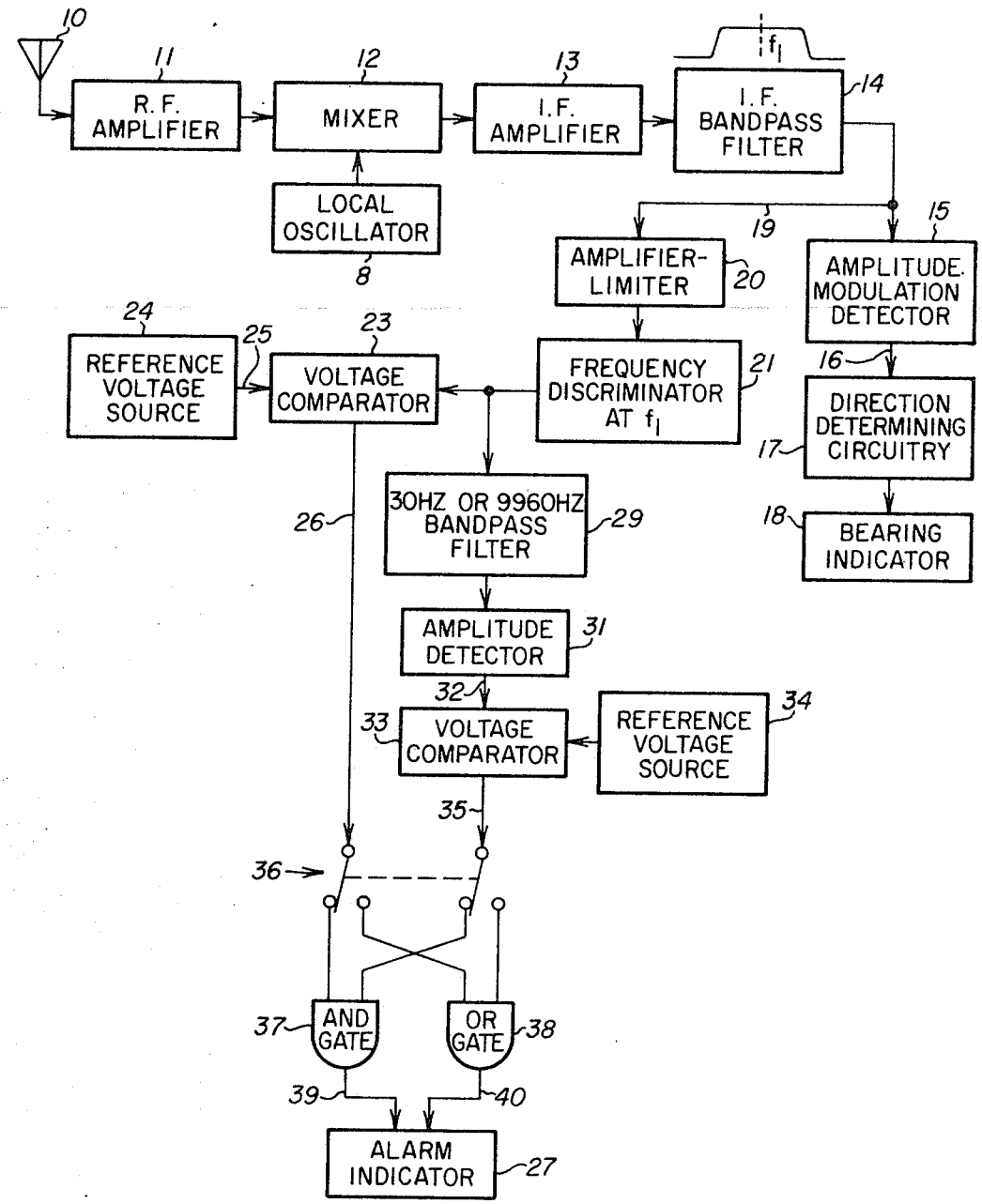
FIG. 3 is a functional block diagram of a still further monitoring embodiment in accordance with the present invention.

The embodiment of FIG. 3 represents a combination of the two basic methods in which the DC output from frequency discriminator 21 is compared directly as in the FIG. 1 embodiment, and also where a 30 Hz or 9960 Hz bandpass filter 29 is added with its amplitude detector and its comparator as in the FIG. 2 embodiment.

With reference to FIG. 3 it is noted that the output from frequency discriminator 21 might be applied to voltage comparator 23 for comparison with reference voltage source 24 to develop a threshold signal for alarm activation based on the DC output from frequency discriminator 21. The output from frequency discriminator 21 might additionally be applied through a 30 Hz or 9960 Hz filter 29 the output of which is applied to an amplitude detector 31 to develop a second threshold signal 32 for application to a further voltage comparator 33. Voltage comparator 33 will develop a flag activating output 35 when the signal 32 from amplitude detector 31 exceeds the voltage from reference voltage source 34.

The embodiment of FIG. 3 indicates a switch 36 by means of which the respective outputs 26 and 32 from voltage comparators 23 and 33 may be applied as respective inputs to either an AND gate 37 or an OR gate 38. The output 39 from AND gate 37 is applied to the alarm indicator 27 as is the output 40 from the OR gate 38. Assuming that the switch 36 is positioned to supply the voltage comparator outputs to AND gate 37, the flag activation would require both the presence of DC in the output of frequency discriminator 21, as indicated by the presence of signal 26 from voltage comparator 23, and the presence of either 30 Hz or 9960 Hz AC in the output from frequency discriminator 21, as indicated by an output 35 from voltage comparator 33, before the alarm indicator 27 would be activated.

Further, should function switch 36 be positioned to supply the voltage comparator outputs to OR gate 38 instead of AND gate 37, the system would allow the tailoring of the mistuning detection within the receiver to particular types of distortion and provide the equipment designer more flexibility in handling other types of distortion that may arise in the future, in addition to the specific types described herein.

The present invention is thus seen to provide means for providing an alarm indication in those instances when a VOR receiver might present a false VOR bearing indication due to being sufficiently mistuned from a desired signal or by being tuned to an unused adjacent channel separated 50 kHz from an active VOR channel by the addition of monitoring circuitry operating on the output of the IF bandpass filter of the standard VOR receiver. With the advent of 50 kHz spacing of VOR stations, solutions to the problem of false VOR bearing indications such as provided by the present invention fall into the undesirable alternatives of (1) not going to 50 kHz spacing, (2) assuming that the condition can never exist where there can be a strong signal in a channel adjacent to that to which the receiver is tuned at the same time that there is no signal in the channel to which the receiver is tuned, or (3) a tightening up of frequency tolerances in the transmitters and receivers so that filters with sufficiently narrow bandwidths to avoid the problem can be used. These alternatives are generally unsatisfactory, particularly the first two. Further, the tightening up of frequency tolerances to avoid the problem is obviously an expensive alternative in terms of dollar cost to provide the required frequency precision. As a result of the small low-priced integrated circuits now available, the amplifier-limiter, frequency discriminator, and voltage comparator arrangements of the present invention would add little cost to a VOR receiver in comparison to the cost of obtaining precision frequencies necessary to avoid the problem.

Although the present invention has been described with respect to particular embodiments thereof, it is not to be so limited as changes might be made therein which fall within the scope of the present invention as defined in the appended claims.

I claim:

1. In a variable omnirange receiver comprising a local oscillator and frequency mixing means from which is developed an immediate frequency signal, intermediate frequency bandpass filtering means receiving said intermediate frequency signal and supplying an input to amplitude modulation detecting means, and direction determining circuitry receiving the output from said amplitude modulation detecting means and producing a signal proportional to the bearing between said receiving means and a tuned ground station source; means for monitoring and annunciating the condition of said receiving means being tuned to an inactive channel adjacent an active channel, said monitoring means comprising a frequency discriminator operating about the center frequency of said intermediate frequency bandpass filtering means and receiving the output from said intermediate frequency bandpass filtering means for monitoring asymmetrical location of frequency components comprising said intermediate frequency signal within the passband of said intermediate frequency bandpass filter, alarm indicating means, said alarm indicating means receiving the output from said frequency discriminator and being activated thereby when said aforedefined frequency components are asymmetrically disposed within the bandpass of said intermediate frequency bandpass filter, said alarm indicating means comprising a first threshold means receiving the output of said frequency discriminator and responsive to a predetermined DC voltage output magnitude from said frequency discriminator to produce an output signal, a further threshold means receiving the output of said frequency discriminator and responsive to the presence in the output of said frequency discriminator means of alternating current signals at one of the alternating current signal components 30 Hz and 9960

Hz to produce an output signal, and logic gating means receiving the outputs from each of said first and second threshold means; said alarm indicating means being activated in response to an output from at least one of said first and second threshold means.

2. Monitoring means as defined in claim 1 wherein said logic gating means comprises an OR gate.

3. Monitoring means as defined in claim 1 wherein said logic gating means comprises an AND gate and said alarm indicating means is activated in response to simultaneous outputs from each of said first and second threshold means.

* * * * *